June 6, 1939.  R. E. MILLER  2,161,718
LEVELING DEVICE
Filed June 15, 1938  2 Sheets-Sheet 2
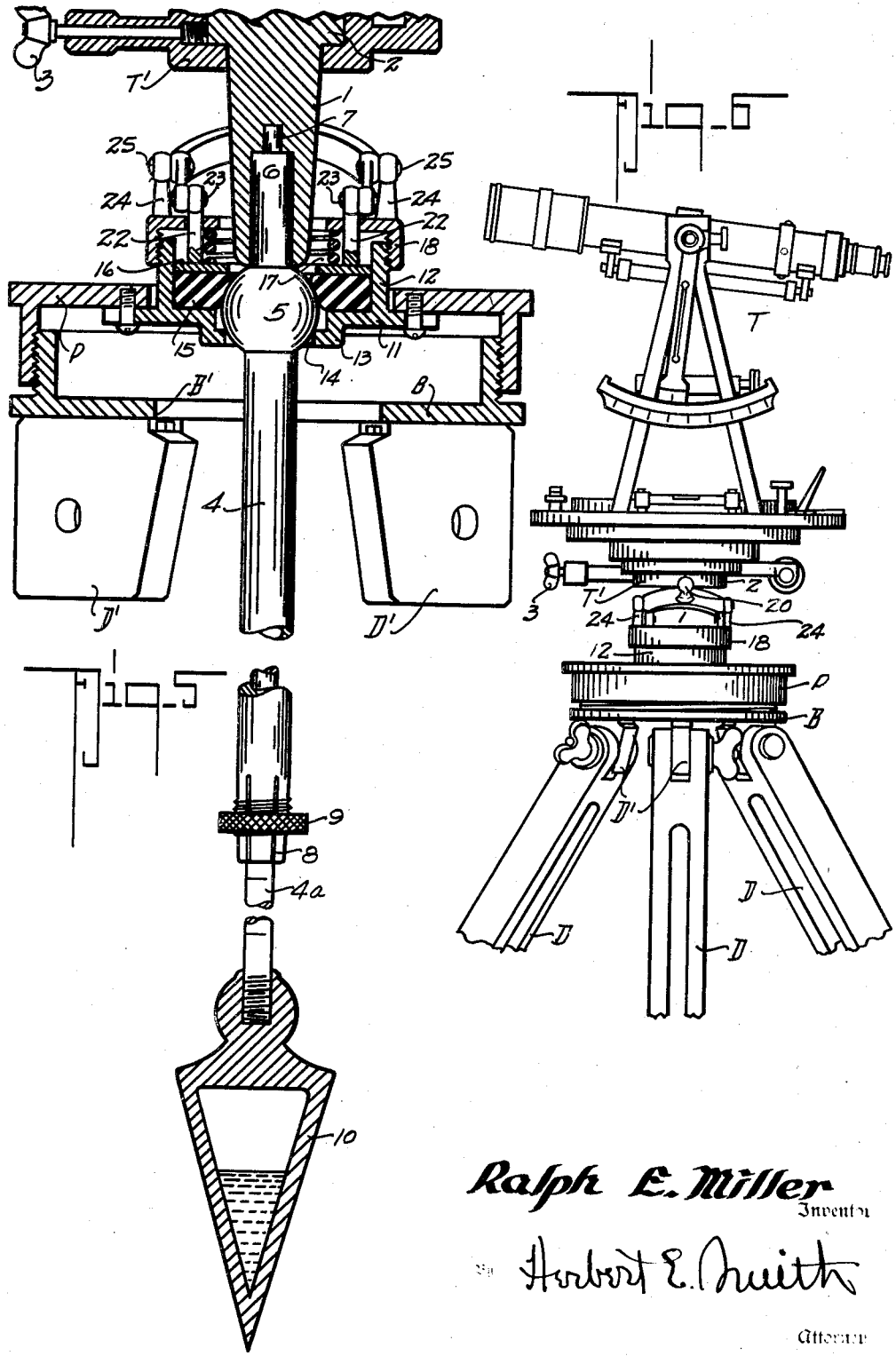
Ralph E. Miller
Inventor
Herbert E. Smith
Attorney

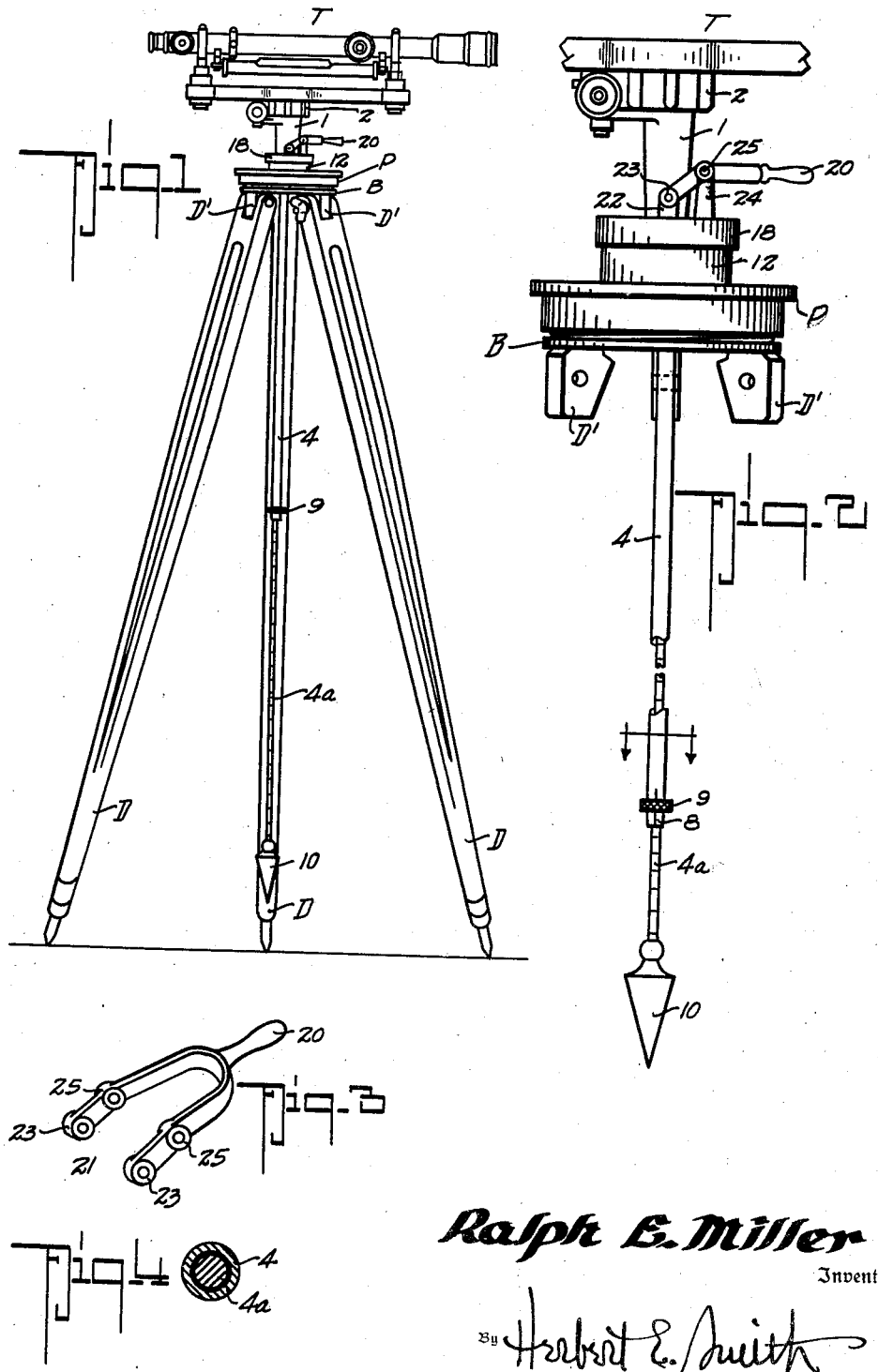

Patented June 6, 1939

2,161,718

UNITED STATES PATENT OFFICE 2,161,718

LEVELING DEVICE

Ralph E. Miller, Newport, Wash.

Application June 15, 1938, Serial No. 213,791

2 Claims. (Cl. 248—182)

The present invention relates to an improved leveling device which, while applicable for use with various supports or stands, is especially adapted for use with surveying and other geometrical instruments, and the leveling device of the invention is embodied in the stand, support, or tripod, usually employed to support such instruments.

In carrying out my invention I utilize a universally adjustable plumb-bob and accessories including a form of ball and socket joint in combination with the transit or other instrument and the stand or tripod for supporting the transit, and by means of my improved leveling device the instrument may be automatically plumbed or leveled regardless of the position of the legs of the tripod or support. Automatic means are employed for clamping the universal joint in adjusted position and for holding the instrument in its leveled position, and a control device is also employed in connection with the clamping means for releasing the latter in order to permit automatic adjustment of the parts.

By the utilization of my novel leveling device, the transit or other instrument may quickly and with accuracy be leveled, and retained in rigid position, to insure reliability in the work of the surveyor or other engineer.

The invention consists in certain novel combinations and arrangements of parts involving the transit or similar instrument and its supporting stand or tripod, together with the leveling device, as will hereinafter be more fully pointed out and claimed.

In the accompanying drawings I have illustrated one complete example of the physical embodiment of my invention in connection with a surveyor's transit and tripod, in which the parts are combined according to one mode I have devised for the practical application of the principles of my invention. It will be understood that changes and alterations may be made in the exemplifying structures, within the scope of my claims, without departing from the principles of my invention.

Figure 1 is a view in side elevation of a transit equipped with the automatic leveling device of my invention.

Figure 2 is an enlarged view in elevation of parts of Figure 1, showing the arrangement of the leveling device.

Figure 3 is a perspective view of the release lever for the clamp of the universal joint.

Figure 4 is a transverse sectional view of the extensible plumb-rod, as at line 4—4 of Figure 2.

Figure 5 is an enlarged vertical sectional view of the parts forming the automatic leveling device.

Figure 6 is a view in elevation as seen from the right side of Figures 1 and 2.

In order that the general arrangement and relation of parts may readily be understood I have illustrated a standard type of surveyor's transit, indicated as a whole by the letter T, and the usual tripod is made up of legs D pivoted on the lugs D' of the bed B which forms the head of the stand or support, and is fashioned with an open center B'.

The usual flanged, circular, plate P, having an open center P', is threaded on the flanged bed B, and the transit is supported above and centrally of the plate, through the use of a boss 1 rigid with the lower part or head 2 of the transit, and a set screw 3 is shown in the collar T' of the transit for holding these parts in adjusted position.

The boss 1 of the transit is mounted at the top of a plumb-rod, which is extensible, and comprises an upper tubular bar 4 having a spherical head or ball 5 rigid therewith, and above the ball is fashioned a spindle 6 having a reduced end or pin 7 projecting into a complementary socket in the lower end of the boss 1. The boss of the transit is rigid with the spindle, and through the instrumentality of the ball or spherical head, the transit is centrally supported in the bed or head of the tripod.

The plumb-rod also includes a graduated rod 4a that telescopes in the tubular bar 4, the measurements on the rod being used in ascertaining the distance between the tip of the plumb bob 10 and the cross-hairs of the transit. For clamping the bar 4 and the rod 4a in adjusted position, the lower end of the tubular bar is split, as at 8, to form resilient tongues that are clamped on the enclosed rod by means of a clamp nut 9 after the proper adjustment between the bar and the rod has been made.

The plumb-bob 10, which may be hollow and contain mercury as indicated in Figure 5, is of usual type, and is threaded on the lower end of the rod 4a.

Thus it will be apparent that the transit, or other instrument, is rigid with the plumb-rod 4, 4a as a whole, and of course the spherical head or ball 5 is rigid with both the transit and the plumb-rod, so that these rigid parts may oscillate in the bed, with the universal joint as a center, to automatically adjust and level the transit, when such oscillation of the plumb-rod and transit is permitted.

The socket-members of the universal or ball and socket joint are supported in the circular shifting plate 11 that is fitted up against the underside of the plate P, and an annular flange 12 of the plate 11 is centered in and projects upwardly through the opening P' of the plate P, to form a bearing cup for the joint. The 11 is also formed with a central depression 13 which forms a socket-cup for the ball or spherical head 5, and the ball is seated in the open center 14 of this socket-cup. Within the bearing cup or flange 12 is fitted an annular, open center bearing-head or clamp-head 15, of rubber or other compressible, resilient material, that frictionally engages the upper part of the ball or spherical head, and on top of this compressible head is mounted a vertically movable presser-ring 16 that is enclosed within the bearing cup 12.

The presser-ring compresses the friction-head 15 into close frictional contact with the ball 5, and the latter is rigidly held in its seat 14 to hold the transit and the plumb-rod in adjusted perpendicular position. In setting the instrument for use, the legs of the tripod are first properly adjusted on the ground surface, and then the clamped ball or spherical head is released, thereby permitting the plumb-rod and transit to automatically assume a perpendicular position, under the action of gravity, and then, in this perpendicular position, the instrument, through the clamping of the universal joint, is held rigidly in proper position for the work.

The presser-ring and the bearing head are held in clamping position on the ball through the instrumentality of a strong coiled spring 17, and this spring is placed under tension by the use of a screw-cap 18 which is internally threaded to screw down on the externally threaded bearing cup 12, and the spring is interposed between the annular flange 19 or open-center top plate of the screw cap 18, and the annular plate 16 as seen in Figure 5.

The clamped joint is released by lifting the presser-plate against the tension of the spring to free the friction head 15 from the ball 5, and for this purpose I use a release lever 20 fashioned with a forked end 21, as best seen in Figure 3, the lever being located above the joint with the forked end partially surrounding the transit-boss 1.

Two diametrically arranged posts 22 rise from the top of the presser ring or clamp ring 16, and pass through holes in the open-center top of the screw cap 18, and at 23 the forked end of the lever is pivoted to these posts. The two fulcrum points for the lever are mounted on two posts 24 that rise from the top of and are rigid with the screw cap 16, and at 25 the lever is pivoted to these posts.

Thus the spring 17 normally holds the socket members clamped on the ball or spherical head, with the transit and plumb-rod in rigid relation to the stand or tripod, and by pressing down on the free end of the lever, the presser plate or clamp ring 16 is lifted to release the socket-head or bearing head 15 from the ball 5. After the transit and plumb-rod have oscillated by the action of gravity to perpendicular position, the lever is released, and the spring 17 automatically clamps these members of the instrument in working position.

Having thus fully described my invention, what I claim as new and desire to secure by Letters Patent is:

1. In a leveling device, the combination with a stand and its bearing-support, of a plumb-rod and an instrument mounted thereon, a ball rigid with the plumb-rod and seated in said bearing-support, a resilient friction-head mounted in the support and engaging the ball, a presser-plate mounted on the friction head, a tension-spring mounted in the bearing support and engaging said presser-plate, and means for releasing the tension of the spring from said friction-head.

2. In a leveling device, the combination with a stand and its bearing support, of a plumb-rod and an instrument mounted thereon, a ball rigid with the plumb-rod and seated in the bearing-support, a friction-head mounted in the support and engaging the ball, a presser-plate mounted on the friction-head, a tension spring mounted in the bearing support and engaging said presser-plate, a release lever pivoted on the bearing support, and a pivotal connection between said lever and the presser-plate.

RALPH E. MILLER.